United States Patent [19]

Mogtader

[11] 4,096,357

[45] Jun. 20, 1978

[54] TOLL-CALL RESTRICTION SYSTEM

[76] Inventor: Charles S. Mogtader, 619 N. Camden Dr., Beverly Hills, Calif. 90210

[21] Appl. No.: 742,896

[22] Filed: Nov. 18, 1976

[51] Int. Cl.² .............................................. H04M 1/66
[52] U.S. Cl. ................................................ 179/18 DA
[58] Field of Search .......................... 179/18 DA, 6 E

[56] References Cited

U.S. PATENT DOCUMENTS 3,920,936  11/1975  Mogtader .................. 179/18 DA
3,953,680  4/1976   Zimmermann ................ 179/6 E Primary Examiner—William C. Cooper
Attorney, Agent, or Firm—Lindenberg, Freilich, Hornbaker, Wasserman, Rosen & Fernandez

[57] ABSTRACT

Apparatus for enabling a user to selectively defeat the toll-call restriction system. The apparatus is comprised of means for applying a tone to the telephone lines through the calling telephone mouthpiece. Detection means responsive to the tone sets a flip flop which functions to inhibit the activation of a relay normally used to disrupt the connection between the calling phone and telephone lines when an unpermitted telephone number is dialed.

4 Claims, 1 Drawing Figure

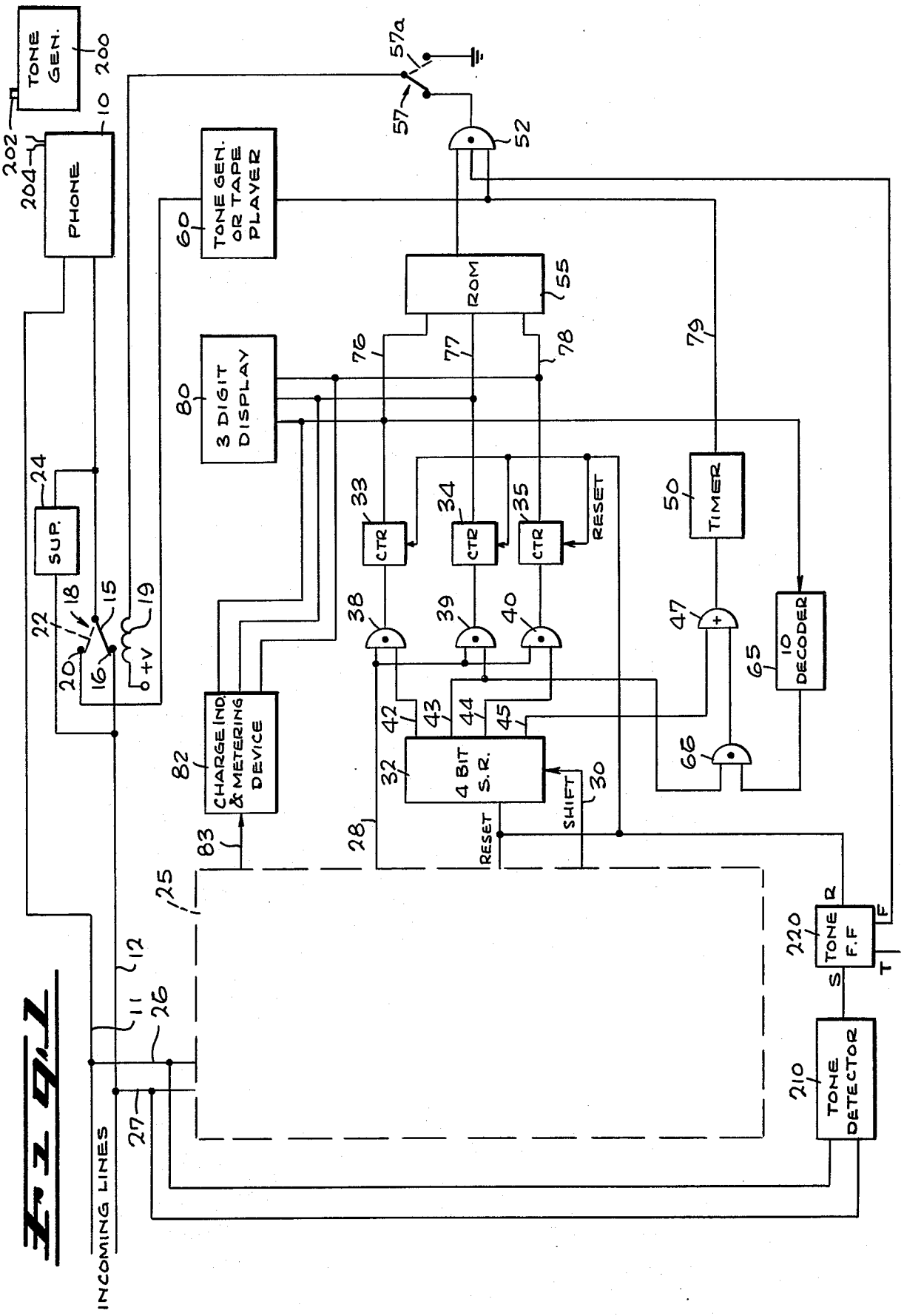

TOLL-CALL RESTRICTION SYSTEM

BACKGROUND OF THE INVENTION

This invention relates to improvements in systems for restricting the telephone numbers which can be reached from a calling telephone.

U.S. Pat. No. 3,920,936 discloses a system for restricting the telephone exchanges which can be reached from a calling telephone unit. As is explained in said U.S. Pat. No. 3,920,936, there are situations in which it is desirable to restrict the telephone exchanges accessible in a pair of telephone lines. The primary reason for such restriction in commercial establishments with many phones and employees, is to limit telephone usage by employees to authorized exchanges and prevent them, or any unauthorized personnel, from dialing telephone exchanges with respect to which toll-call or long-distance charges are incurred. In private homes, it is often also desirable to limit the phone use to specified local exchanges and thereby prevent users in the home from making calls for which additional charges are incurred.

Briefly, in the embodiment disclosed in said U.S. Pat. No. 3,920,936, a read-only memory (ROM) is provided which stores three-digit combinations, each representative of a permissible telephone exchange or area code. The first three digits dialed by a telephone user are stored and digitally compared with the contents of the ROM. If a match is located, than the call is permitted to be completed in a conventional manner. If no match is found, a disabling signal is generated to disrupt the connection between the calling telephone unit and telephone lines, thereby preventing the user from reaching the dialed number.

SUMMARY OF THE INVENTION

The present invention is directed to improvements applicable to toll-restriction systems and more particularly to means for selectively preventing the system from restricting telephone numbers which can be reached from a calling telephone unit.

In a typical telephone restriction system installation, e.g. in large companies having a great number of telephone units, it is generally necessary that some means be provided for selectively avoiding the action of the restriction system to enable calls to be completed by certain authorized personnel to otherwise restricted telephone exchanges. In said U.S. Pat. No. 3,920,936, a switch is provided for bypassing the entire restriction system. The actual implementation of the switching function has proven to be difficult and inconvenient, particularly where the telephone units are distributed over a large area and where they are connected through a rotary unit to multiple lines.

In accordance with the present invention, a portable tone generator unit is provided to each user authorized to selectively disable the restriction system. The user activates the tone generator unit to produce a tone (sound) which is picked up by the telephone unit mouthpiece and applied to the telephone lines prior to the user dialing any digits. A tone detector monitoring the telephone lines responds to the tone by disabling the means within the restriction system for disrupting the connection between the calling telephone unit and the telephone lines.

The novel features of the invention are set forth with particularity in the appended claims. The invention will best be understood from the following description when read in conjunction with the accompanying drawing in which FIG. 1 comprises a block diagram of an embodiment of the invention, similar to that depicted in FIG. 1 of U.S. Pat. No. 3,920,936, but modified to incorporate the teachings of the present invention.

DESCRIPTION OF THE PREFERRED EMBODIMENTS

FIG. 1 comprises a block diagram very similar to FIG. 1 of aforecited U.S. Pat. No. 3,920,936 but modified to show how apparatus in accordance with the present invention is incorporated to enable a telephone unit user to selectively inhibit the restriction function. The newly incorporated elements in FIG. 1 herein comprise tone generator 200, tone detector 210, and tone flip flop 220. By way of review, that portion of FIG. 1 herein which is common to FIG. 1 of U.S. Pat. No. 3,920,936 will be discussed initially followed by an explanation of the structure and function of the apparatus introduced in accordance with the present invention.

The exemplary embodiment of FIG. 1 assumes the use of a dial-type phone 10 and further assumes that any telephone exchange to be reached is represented by the first three dialed digits. Therein, numerals 11 and 12 designate the telephone lines which are conventionally connected directly to the phone. In the present invention, one of the lines, e.g. line 12, is connected to the phone 10 through a movable contact 15 and a stationary contact 20. As shown, the relay is assumed to be energized or simply ON thereby providing electrical continuity between line 12 and the phone 10. When the relay is de-energized, i.e., switches to OFF, the contact between contacts 15 and 16 is broken and contact 20 is connected to the phone 10 through movable contact 15, as shown by the dashed line 22. To prevent arcing between contacts 15 and 16, due to contact make or break, an arc supressor 24 is connected across them.

In the contacts' positions, as shown, the lines 11 and 12 are connected to the phone 10 as if the system of the invention were not present. The system includes an input unit 25 which is connected across the lines 11 and 12 by lines 26 and 27. Unit 25, whose operation is described in detail in said U.S. Pat. No. 3,920,936, has at least three output lines 28–30.

As the receiver of phone 10 is picked up and each of the digits of the desired phone is dialed, unit 25 produces a sequence of pulses on line 28, corresponding to the sequence of pulses produced on lines 11 and 12. The number of pulses in each sequence is equal to the dialed digit except that for the dialed digit 0, 10 pulses are provided. At the end of each dialed digit, and before a subsequent digit is dialed, unit 25 produces a shift pulse on line 30. If, however, before dialing the first three digits, or after the end of the telephone conversation, the receiver is returned to the phone hooks or cradle, or the latter is depressed for redialing, a reset pulse is produced by unit 25 on line 29.

For a telephone system in which an exchange is reachable by the first three digits, the system of the present invention includes a 4-bit (stage) shift register 32, three counters 33–35, and three input And gates 38–40, respectively associated with counters 33–35. Register 32 and the counters are reset by each reset pulse on line 29. When reset, the register's first bit or stage is set to a high state and each of the other three bits to a low state. When the first shift pulse is applied thereto, the high state is shifted to the next bit and the first bit is driven to its low state. Each succeeding shift pulse shifts the high state to a succeeding bit while returning the preceding bit to the low state. At any time, only one bit is at a high state and the other three at the low state. The register has four output lines 42-45, respectively associated with the first through fourth bits of the register. Thus, at any time, only the output line, which is connected to the bit at the high state, is at a high level or simply high, while the other three output lines are at low level or simply low.

Output lines 42-44 are shown respectively connected to gates 38-40 while output line 45 is connected through an Or gate 47, whose function can be ignored for the present description, to a timer 50. The output of the latter is shown connected as one input to an And gate 52. The other input of gate 52 is connected to the output of a read only memory (ROM) 55 which is connected to counters 33-35.

The function of the ROM 55 is to provide a low output to gate 52 whenever the three numbers in counters 33-35, representing a three-number combination, is one which corresponds to the number of an exchange to which the user is to have access. On the other hand, if the three-number combination in the counters is one which corresponds to the number of an exchange to which the user is not to have access, the ROM output to gate 52 is high.

It should be appreciated that various circuits may be used in implementing the ROM 50. For example, a ROM with magnetic cores may be used. However, to reduce system cost a ROM consisting of a monolithic diode matrix may be employed. In such a ROM, the three-number combination in the counters represents an address of a location in the memory. The ROM is designed so that only when any one of selected locations therein representing different exchanges to which access is permitted is addressed by the three-number combination in the counters, a low output is produced. Otherwise, the ROM output is high. For explanatory purposes and to define the scope of the invention, each location which when addressable by the three-number (or multinumber) combination from the counters produces a low output is assumed to store a three-number combination designating an accessible exchange. Thus, the ROM required for the present invention is one which produces an output of a first level, e.g., low when a multinumber combination supplied thereto matches any multinumber combination in the ROM. Otherwise, the ROM output is of a second level, e.g., high.

The output of gate 52 is shown connected to a switch 57 which is in turn connected to one end of coil 19, the other end of which is connected to a source of voltage designated +V. With switch 57 in the position as shown, the phone 10 is controlled by the system. As long as gate 52 is not enabled, its output is sufficiently low (with respect to +V) thereby producing a sufficient voltage drop across the coil 19 to hold the relay ON, thereby connecting the phone 10 across lines 11 and 12. On the other hand, when the first three dialed digits represent an exchange to which the user of phone 10 is not to have access, the output of gate 52 goes high, as will be described hereinafter, thereby de-energizing relay 18. As a result, the connection between line 12 and the phone 10 is broken. The system may be completely bypassed by switching switch 57 to the position represented by line 57a. When in this position, switch 57 connects one end of the coil 19 to ground thereby maintaining the relay ON so that the phone 10 remains connected to line 12 through contacts 15 and 16 regardless of the dialed exchanges.

Briefly, gate 52 provides a high output only when the output of timer 50 is high and the output of ROM 55 is high. The former is high for a fixed time period, e.g., 2 seconds, after being enabled by a high level on line 45. As previously stated, the output of ROM 55 is high as long as the three numbers stored in counters 33-35, representing a three-number combination, does not match any of a plurality of three-number combinations in the ROM. These three-number combinations represent exchanges to which the user is permitted to have access. The numbers in counters 33-35 respectively represent the first, second and third digits of the three-digit number. If however, the three numbers in the three counters comprise a combination in the ROM, the latter's output is low and therefore gate 52 remains disabled and its output remains low, regardless of the timer's output level.

It should thus be appreciated that the relay is disabled, thereby disrupting the connection between phone 10 and the incoming lines 11 and 12, only during the time period defined by timer 50 and only if during said timer period the output of ROM 55 is high. Thus, it is the content of ROM 55 which controls which exchanges are accessible by phone 10. If desired, ROM 55 may store combinations representing the non-available exchanges. However, since for practical purposes the number of non-available exchanges will be greater than those to which access is to be permitted, the latter rather than the former are stored in ROM 55.

The foregoing description will now be described in connection with a specific example. Let it be assumed that a user raises the receiver of phone 10 and starts dialing a phone number whose first three digits are 938. Prior to dialing, the relay 18 is ON, as shown in FIG. 1, and shift register 32 is reset so that its first bit is high and counters 33-35 are all reset so that each stores a 0. Thus, the three number combination from the counters is 000. The ROM does not include such a number and therefore, its output is high. However, the output of gate 52 is low, since timer 50 was not yet activated and therefore its output is low, thereby holding relay 18 ON. As the first digit 9 is dialed, due to the 9 pulses appearing on lines 11 and 12, input unit 25 produces a sequence of 9 pulses on line 28. Since the first bit of register 32 is high, line 42 is high and only gate 38 is enabled. Thus, the 9 pulses pass through gate 38 and are stored in counter 33, which now stores the number 9. After dialing the 9 and before dialing the 3, unit 25 provides a shift pulse on line 30. Thus, the register 32 shifts the high state from the first bit to the second bit. Consequently, only output line 43 is high, enabling gate 39 while gate 38 is disabled when the first bit is shifted back to low. When the digit 3 is dialed, 3 pulses are produced on line 28. Since gate 39 is enabled, they are clocked into counter 34. Thus, the latter stores the number 3.

Before dialing the 8, another shift pulse is produced by unit 25 on line 30. Thus, the third bit of register 32 goes high enabling gate 40. Unit 25 now produces a sequence of 8 pulses which are clocked into counter 35 through enabled gate 40. Thus, the counters 38-40 respectively store the numbers 9, 3, and 8 representing the three-number combination 938. The combination in counters 33—35 is continually compared with the three-number combinations in the ROM 55.

After the 8 digit is dialed and before the next digit is dialed, another shift pulse is provided by unit 25. Thus, the fourth bit of register 32 goes high. Consequently, output line 45 goes high and through Or gate 47 enables the timer 50. The latter produces a high output for a selected period, e.g., 2 seconds. During these 2 seconds, if the ROM 55 stores a combination 938, its output remains low and therefore even though the timer output is high, gate 52 remains disabled, producing a low output which holds the relay ON, thereby enabling the completion of the call. If, however, ROM 55 does not store the combination 938, its output is high. Therefore, during the 2 seconds that the timer's output is high, gate 52 is turned ON to produce a high output. Consequently, relay 18 is turned OFF, breaking the connection between phone 10 and line 12. Thus, the call cannot be completed.

The contents of the three counters can be thought of as a three-number combination or a three-digit number. In each counter the stored number is the same as a dialed digit, except that for the dialed digit 0, the counter stores the number 10.

The 2-second period during which the line connection is broken is sufficient for the first three dialed digits to be ignored by the telephone equipment. Then, after the 2 seconds, the output of timer 50 is low, thereby disabling gate 52. Thus, the relay is turned ON again, line connection is re-established, and the original dial tone is re-established. When the phone is disconnected, i.e., relay 18 is OFF, the unit 25 produces a reset pulse on line 29 which resets the register 32 and the counters 33–35 to the original state. Thus, if the same number starting with 938 is redialed, the operation merely repeats itself. Although the phone disconnect takes place prior to the end of the 2 seconds and clears the counters, since the cleared or reset counters store the combination 000 which is not present in the ROM, it produces a high output and therefore the disconnect lasts for the full 2 seconds defined by the timer's output.

If desired, the system may include a tone generator or tape player designated by block 60 and hereinafter referred to as unit 60. It is shown activated by the timer output and its output is connected to contact 20. Thus, when the relay is OFF and the timer output activates unit 60, the latter sends either a selected tone or message to the user to inform him that the call cannot be made on phone 10.

From the foregoing, it should thus be appreciated that the system is capable of preventing any call from being completed from phone 10, based on the first three digits of the call number. With this system, calls are restricted only to those numbers whose first three digits are represented by three-number combinations in ROM 55. Clearly, the ROM may include any desired set of three-number combinations and may be tailored for the user's particular needs.

The ROM may be made to include all exchanges in the particular area code, in which the phone is located, while excluding all other area codes, as well as exclude certain exchanges within the particular area code while including selected area codes. In this embodiment with three counters, once a remote area code is included in the ROM, all exchanges within that area code are accessible.

Although all phones in the United States are presently reachable by direct dialing, quite often operator assistance is employed by dialing the digit 0. The system of the present invention may include circuitry to abort all operator calls. Such operator-call abort circuitry is represented in FIG. 1 by a 10-digit decoder 65 and an And gate 66. The former is connected to the output of counter 33 and its output is connected to one input of gate 66, whose other input is connected to line 43 of register 32. The output of gate 66 is connected to Or gate 47.

In operation, when the first dialed digit is a 0, 10 pulses are produced by unit 25 which are stored in counter 33 as a number 10. The other two counters 34 and 35 store 0's. The ROM does not include the combination 10-0-0. Thus, its output is high. When counter 33 stores a 10, decoder 65 provides a high output to gate 66. After dialing the first digit, register 32 is shifted so that its second bit is high. Thus, line 43 is high and since the output of decoder 65 is high, the gate 66 output is high, activating timer 50 through gate 47. As a result, both inputs to gate 52 are high and consequently, the output of the latter is high, thereby switching the relay to OFF. Thus, all operator calls are aborted, after dialing only the digit 0.

It should be appreciated that the system of the present invention is not required for each phone instrument but rather for each pair of lines 11 and 12, i.e., for each number to which one or more phones may be connected directly or through a company telephone exchange unit. Thus, phone 10 can be viewed as a group of phones, any one of which is connectable to lines 11 and 12.

The portion of FIG. 1 described thus far is common to the aforementioned U.S. Pat. No. 3,920,936. The present invention is directed to improved means for enabling the user to selectively defeat or bypass the restriction function to enable him to complete a call to an otherwise unpermitted telephone exchange.

More particularly, in accordance with the present invention, a tone generator 200 is provided and made available to each user who is authorized to defeat or bypass the restriction system. The tone generator 200 is preferably a portable unit having a push-button 202 to enable a user to produce a tone or sound wave having certain precise and predetermined characteristics. Typically, the sound produced by the tone generator 200 would comprise a single tone of precise frequency. In use, the user will initially lift the handset of the telephone unit 10 from the cradle and then activate the tone generator to produce a tone proximate to the telephone unit mouthpiece 204. Since the tone is generated prior to the user dialing any digits, the telephone unit 10 is coupled to the telephone lines 11 and 12 through the normally closed switch contact 15.

A tone detector 210 is connected to the telephone lines 11 and 12 and is tuned to respond to the characteristics of the signal appearing in lines 11 and 12 representative of the tone produced by the tone generator 200. The output of tone detector 210 is connected to the set input terminal of tone flip-flop 220. Thus, the tone detector 210 will set the flip-flop 220 in response to the tone generator 200 being activated. By setting the tone flip-flop 220, its true output terminal will be forced to a high logic level while its false output terminal will be forced to a low logic level. As depicted in FIG. 1, the false output terminal of flip-flop 220 is connected as an input to And gate 52. Thus, with tone flip-flop 220 in its set state, And gate 52 is disabled, thereby preventing the deenergization of relay coil 19. In other words, when the tone flip-flop 220 is in its set state, the relay coil 19 cannot be deenergized to open the normally closed switch contacts 15 and 16. Therefore, the setting of the tone flip-flop 220 prevents the restriction system from operating to disrupt the connection between the telephone unit 10 and the telephone lines 11 and 12. It should be recognized that although it has been assumed that switch contacts 15 and 16 are closed when relay coil 19 is energized, the system can be oppositely wired to require coil 19 to be energized to open contacts 15 and 16. In this manner, a power failure will not disrupt telephone service.

The reset input terminal of tone flip-flop 220 is connected to the reset line 29 of unit 25. As has already been described herein, unit 25 produces a reset pulse on line 29 in response to the user returning the telephone unit handset to its cradle. Thus the tone flip-flop 220 will normally be in a reset state, except when it is intentionally set by a user by activating a tone generator 200 prior to disruption of the connection between the telephone unit 10 and the telephone lines 11 and 12.

Although it has herein been assumed that the tone generator 200 provides a single frequency tone, it will readily be recognized by those skilled in the art that the tone generator 200 can be more complex and can provide multiple tones or a more complex waveform, if necessary, to facilitate discrimination by the tone detector 210. Moreover, although the improvement herein has been described specifically in connection with an embodiment usable with a dial-type telephone unit, it will be readily appreciated that the improvement in accordance with the present invention is readily adapted for use with Touch-Tone telephone unit installations and various other types of telephone systems, as for example are disclosed in said aforecited U.S. Pat. No. 3,920,936.

Accordingly, although a particular embodiment of the invention has been described and illustrated herein, it should be recognized that modifications and variations will readily occur to those skilled in the art, and consequently it is intended that the claims be interpreted to cover such modifications and equivalents.

What is claimed is:

1. In a toll-call restriction system useful with a telephone unit and a pair of telephone lines for restricting the telephone exchanges which can be reached from said telephone unit, said system including normally closed switch means connecting said telephone unit to said telephone lines and interrupt means for opening said switch means to interrupt said connecton, the improvement comprising:
   manually actuatable means for generating a sound wave having predetermined characteristics;
   detector means connected to said telephone lines for sensing the generation of said sound wave; and
   means responsive to said detector means sensing the generation of said sound wave for disabling said interrupt means.

2. The system of claim 1 including a memory storing a plurality of information items identifying those telephone exchanges which said telephone unit is permitted to reach;
   means for producing a mismatch signal in response to said telephone unit identifying a telephone exchange not identified by information stored in said memory;
   said interrupt means including gate means responsive to said mismatch signal for opening said switch means.

3. The system of claim 2 wherein said means responsive to said detector means includes a bistable means for assuming a first state in response to said detector means sensing said sound wave; and
   means responsive to said bistable means defining said first state for disabling said gate means.

4. The system of claim 3 including means for resetting said bistable means to a second state.

* * * * *